(No Model.)

LA FLAVIUS REED.
BARK MILL.

No. 282,771. Patented Aug. 7, 1883.

WITNESSES:
Fred. G. Dieterich
Arthur L. Morsell

INVENTOR.
La Flavius Reed
By Louis Bagger & Co.
ATTORNEYS.

UNITED STATES PATENT OFFICE.

LA FLAVIUS REED, OF HORNELLSVILLE, NEW YORK.

BARK-MILL.

SPECIFICATION forming part of Letters Patent No. 282,771, dated August 7, 1883.

Application filed June 15, 1883. (No model.)

*To all whom it may concern:*

Be it known that I, LA F. REED, a citizen of the United States, of Hornellsville, in the county of Steuben and State of New York, have invented certain new and useful Improvements in Bark-Mills; and I do hereby declare that the following is a full, clear, and exact description of the invention, which will enable others skilled in the art to which it appertains to make and use the same, reference being had to the accompanying drawings, which form a part of this specification, and in which—

Figure 1:
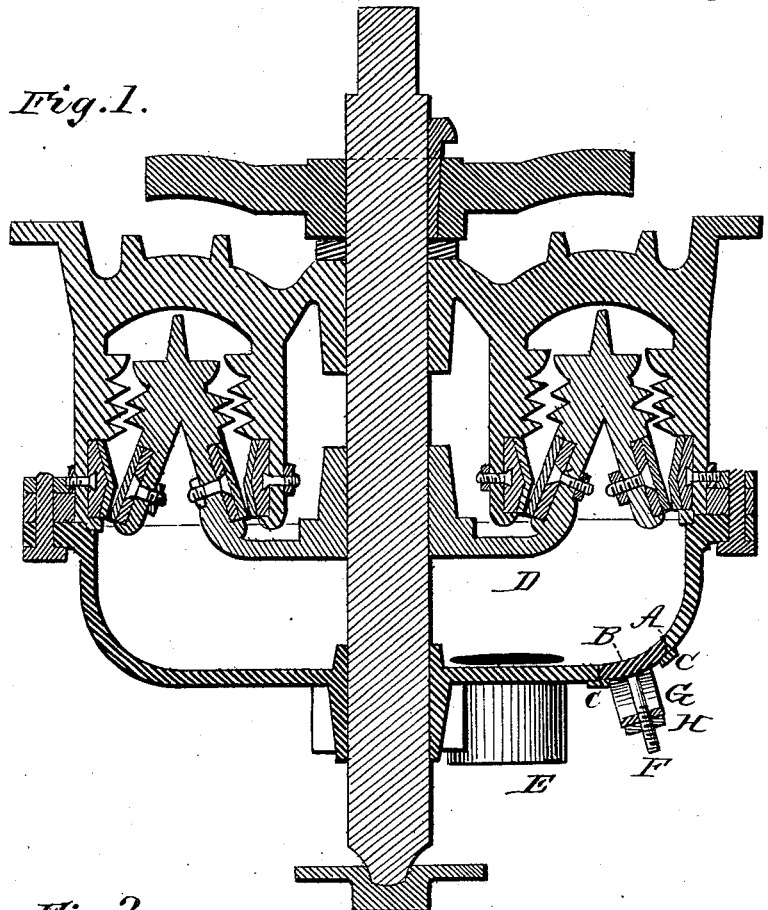
Figure 2:
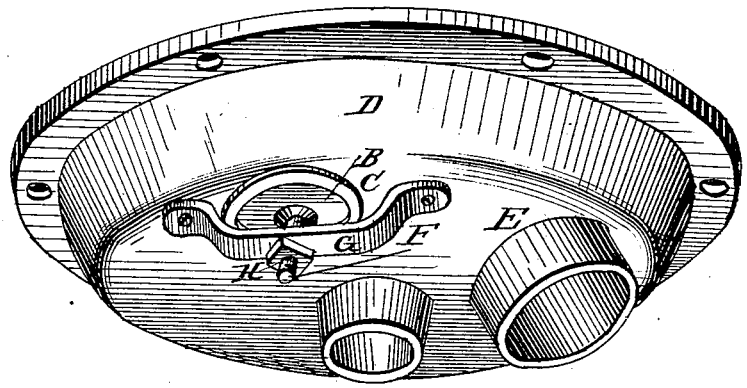

Figure 1 is a vertical sectional view of so much of a bark-mill as is necessary to illustrate my invention, and Fig. 2 is a perspective view of the bowl of a mill provided with my improvement.

Similar letters of reference indicate corresponding parts in both the figures.

My invention has relation to mills for grinding bark, and is applicable to all different mills of that class with which I am acquainted; and it consists in the improved construction and combination of parts of a bowl in which the ground material is received from the grinding parts, provided with a hand-hole so disposed that the mouth of the discharge-pipe may readily be reached for the purpose of cleaning the bowl and said pipe, whenever necessary, without the necessity of having to unbolt and remove the hopper, as hereinafter more fully described and claimed.

In grinding bark for the use of tanners it frequently happens, especially if the material is a little damp, that the bowl becomes clogged up with the ground bark; or this may happen on account of the bark backing up in the discharge-pipe, which may occur from various causes. In the mills as now constructed the bowl and discharge-pipe can only be cleaned by first unbolting the hopper and then taking out the grinding-cones—a task which, in a large mill, requires the labor of two or three men for an hour or more. To obviate this and afford a ready and easy access to the inside of the bowl in the vicinity of the discharge-pipe, I construct the bowl with a flanged opening, A, which is covered by a lid, B, fitting upon the flange C, so that the bowl A will be perfectly smooth and even on the inside. This opening should be made close to the discharge-pipe E, so that by inserting the hand through the aperture the mouth of the discharge-pipe may readily be reached from the inside for the purpose of removing the material obstructing it. The lid or cover B is held in place firmly, when the mill is in use, by a screw-threaded stem, F, inserted through a bail or yoke, G, fastened to the outside of the bowl D and held in place by the nut H.

Having thus described my invention, I claim and desire to secure by Letters Patent of the United States—

As an improvement in bark-mills, the combination of the receiving-bowl, provided with a discharge-pipe and a hand-hole in the vicinity of said discharge-pipe, with a lid or cover for said hand-hole and means for holding the same securely in place when the mill is in use, as and for the purpose shown and set forth.

In testimony that I claim the foregoing as my own I have hereunto affixed my signature in presence of two witnesses.

LA FLAVIUS REED.

Witnesses:
W. H. GREENHOW,
MILES W. HAWLEY.